United States Patent
Fuderer

(10) Patent No.: US 12,467,996 B2
(45) Date of Patent: Nov. 11, 2025

(54) SPIN ECHO MR IMAGING WITH SPIRAL ACQUISITION

(71) Applicant: KONINKLIJKE PHILIPS N.V., Eindhoven (NL)

(72) Inventor: Miha Fuderer, Bunnik (NL)

(73) Assignee: Koninklijke Philips N.V., Eindhoven (NL)

(*) Notice: Subject to any disclaimer, the term of this patent is extended or adjusted under 35 U.S.C. 154(b) by 11 days.

(21) Appl. No.: 18/035,301

(22) PCT Filed: Nov. 4, 2021

(86) PCT No.: PCT/EP2021/080579
§ 371 (c)(1),
(2) Date: May 4, 2023

(87) PCT Pub. No.: WO2022/096545
PCT Pub. Date: May 12, 2022

(65) Prior Publication Data
US 2023/0400545 A1  Dec. 14, 2023

(30) Foreign Application Priority Data

Nov. 9, 2020 (EP) .................................... 20206356

(51) Int. Cl.
*G01V 3/00* (2006.01)
*G01R 33/48* (2006.01)
(Continued)

(52) U.S. Cl.
CPC ... *G01R 33/56341* (2013.01); *G01R 33/4824* (2013.01); *G01R 33/5608* (2013.01)

(58) Field of Classification Search
CPC .......... G01R 33/56341; G01R 33/4824; G01R 33/5608
(Continued)

(56) References Cited

U.S. PATENT DOCUMENTS 5,650,723 A   7/1997 Meyer
6,215,396 B1  4/2001 Script
(Continued)

FOREIGN PATENT DOCUMENTS

JP   2015104489 A   6/2015

OTHER PUBLICATIONS

EP 0818689 A1 (Goto ) (Year: 1998).*
(Continued)

*Primary Examiner* — Walter L Lindsay, Jr.
*Assistant Examiner* — Frederick Wenderoth

(57) ABSTRACT

The invention relates to a method of MR imaging of an object (10) positioned in an examination volume of an MR device (1). It is an object of the invention to enable spiral MR imaging with a reduced level of ringing artefacts close to strong local IC main magnetic field inhomogeneity. The method of the invention comprises the following steps:— generating a spin echo by subjecting the object (10) to an imaging sequence comprising an RF excitation pulse (31) followed by an RF refocusing pulse (32), wherein a modulated readout magnetic field gradient (34) is applied subsequent to the RF refocusing pulse (32),—acquiring MR signal data by recording the spin echo along a spiral trajectory in k-space, wherein the waveform of the readout magnetic field gradient (34) defining the spiral trajectory starts before the spin echo center (33), and—reconstructing an MR image from the acquired MR signal data. Moreover, the invention relates to an MR device (1) and to a computer program for an MR device (1).

15 Claims, 3 Drawing Sheets

(51) Int. Cl.
    *G01R 33/56*     (2006.01)
    *G01R 33/563*     (2006.01)

(58) Field of Classification Search
    USPC .................................................. 324/309
    See application file for complete search history.

(56) References Cited

U.S. PATENT DOCUMENTS

| | | | |
|---|---|---|---|
| 9,188,656 | B2 | 11/2015 | Yui et al. |
| 2001/0006345 | A1 | 7/2001 | Machida et al. |
| 2012/0194189 | A1* | 8/2012 | Sun .................. G01R 33/56341 |
| | | | 324/309 |
| 2014/0152304 | A1 | 6/2014 | Frielden et al. |
| 2015/0301142 | A1* | 10/2015 | Griswold ........... G01R 33/4828 |
| | | | 324/309 |
| 2016/0266225 | A1 | 9/2016 | Johnson et al. |
| 2016/0291113 | A1* | 10/2016 | Stemmer ............ G01R 33/5616 |
| 2017/0322273 | A1* | 11/2017 | Truong .............. G01R 33/4806 |
| 2020/0278413 | A1 | 9/2020 | Kutsuna et al. |

OTHER PUBLICATIONS

Delanande et al "An Echo Shifted Gradient Echo MRI Method for Efficient Diffusion Weighting" Magnetic Resonance in Med. vol. 41, p. 1000-1008 (1999).

Baron et al "B0 Mapping Using Rewinding Trajectories" Magnetic Resonance in Med. vol. 78 p. 663-669 (2017).

Truong et al "Application of K-Space Energy Spectrum Analysis for Inherent and Dynamic B0 Mapping and Deblurring in Spiral Imaging" Magnetic Resonance in Med. vol. 64, p. 1121-1127 (2010).

Fielden Samuel et al."Noncontast Peripheral MRA With Spiral Echo Train Imaging . . . " Magnetic Resonance in Med. vol. 74, No. Apr. 3, 17, 2014 p. 1026-1033.

Wong et al "Single Slab High Resolution 3D Whole Brain Imaging Using Spiral Fse" Proceedings of the International Soc. for Magnetic Resonance in Medicine, Apr. 1, 2000, p. 683.

Frank et al "High Efficiency, Low Distortion 3D Diffusion Tensor Imaging With Variable Density Spiral Fast Spin Echoes " NeuroImage, vol. 49, No. 2 Jan. 15, 2010 p. 1510-1523.

Razzazabal et al "Inhomogeneity Correction Using an Estimated Linear Field Map" Magnetic Resonance in Med. vol. 35, No. 2 Feb. 1996 p. 278-282.

International Search Report and Written Opinion from PCT/EP2021/080579 mailed Jan. 12, 2022.

Joseph L. Holtrop, et al., High spatial resolution diffusion weighted imaging on clinical 3 T MRI scanners using multislab spiral acquisitions , Journal of Medical Imaging , 2016 , vol. 3(2) , 023501-1-7.

Krishna S. Nayak, et al. , Efficient Off-Resonance Correction for Spiral Imaging , Magnetic Resonance in Medicine , 2001 , 45 , 521-524.

* cited by examiner

SPIN ECHO MR IMAGING WITH SPIRAL ACQUISITION

CROSS REFERENCE TO RELATED APPLICATIONS

This application is a U.S. national phase application of International Application No. PCT/EP2021/080579 filed on Nov. 4, 2021, which claims the benefit of EP Application No. 20206356.6 filed on Nov. 9, 2020 and is incorporated herein by reference.

FIELD OF THE INVENTION

The invention relates to the field of magnetic resonance (MR) imaging. It concerns a method of MR imaging of an object. The invention also relates to an MR device and to a computer program to be run on an MR device.

BACKGROUND OF THE INVENTION

Image-forming MR methods which utilize the interaction between magnetic fields and nuclear spins in order to form two-dimensional or three-dimensional images are widely used nowadays, notably in the field of medical diagnostics, because for imaging of soft tissue they are superior to other imaging methods in many respects, do not require ionizing radiation and are usually not invasive.

According to the MR method in general, the object, for example the body of the patient to be examined, is arranged in a strong, uniform magnetic field whose direction at the same time defines an axis (normally the z-axis) of the co-ordinate system on which the measurement is based. The magnetic field produces different energy levels for the individual nuclear spins in dependence on the magnetic field strength which can be excited (spin resonance) by application of an electromagnetic alternating field (RF field) of defined frequency (so-called Larmor frequency, or MR frequency). From a macroscopic point of view the distribution of the individual nuclear spins produces an overall magnetization which can be deflected out of the state of equilibrium by application of an electromagnetic pulse of appropriate frequency (RF pulse), so that the magnetization performs a precessional motion about the z-axis. The precessional motion describes a surface of a cone whose angle of aperture is referred to as flip angle. The magnitude of the flip angle is dependent on the strength and the duration of the applied electromagnetic pulse. In the case of a so-called 900 pulse, the spins are deflected from the z axis to the transverse plane (flip angle 90°).

After termination of the RF pulse, the magnetization relaxes back to the original state of equilibrium, in which the magnetization in the z direction is built up again with a first time constant $T_1$ (spin lattice or longitudinal relaxation time), and the magnetization in the direction perpendicular to the z direction relaxes with a second time constant $T_2$ (spin-spin or transverse relaxation time). The variation of the magnetization can be detected by means of receiving RF coils which are arranged and oriented within an examination volume of the MR device in such a manner that the variation of the magnetization is measured in the direction perpendicular to the z-axis. The decay of the transverse magnetization is accompanied, after application of, for example, a 90° pulse, by a transition of the nuclear spins (induced by local magnetic field inhomogeneities) from an ordered state with the same phase to a state in which all phase angles are uniformly distributed (dephasing). The dephasing can be compensated, e.g., by means of a refocusing pulse (for example a 1800 pulse). This produces an echo signal (spin echo) in the receiving coils.

To realize spatial resolution in the body, magnetic field gradients extending along the three main axes are superposed on the uniform magnetic field, leading to a linear spatial dependency of the spin resonance frequency. The signal picked up in the receiving coils then contains components of different frequencies which can be associated with different locations in the body. The signal data obtained via the receiving coils corresponds to the spatial frequency domain and is called k-space data. A set of k-space data is converted to an MR image by means of an image reconstruction algorithm.

Spiral imaging is a fast MR imaging technique that benefits from an efficient k-space coverage and a low sensitivity to motion and flow artifacts. Spiral k-space trajectories allow for an efficient and temporally flexible sampling of k-space as shorter pathways are required to cover a desired k-space region, and the signal acquisition may start in the center of k-space. Spiral imaging techniques are, however, vulnerable to inhomogeneities in the amplitude of the main magnetic field $B_0$, which causes blurring and degrades the image quality.

De-blurring methods for spiral MR imaging are known in the art. It is known, e.g., to acquire a $B_0$ map and to correct the MR signal data for $B_0$ inhomogeneity effects based on the $B_0$ map (see, e.g., Ahunbay et al., "Rapid method for de-blurring spiral MR images", Magn. Reson. Med. 2000, vol. 44, p. 491-494; Sutton et al., "Fast, iterative image reconstruction for MRI in the presence of field inhomogeneities", IEEE Trans. Med. Imaging. 2003, vol. 22, p. 178-188; Nayak et al., "Efficient off-resonance correction for spiral imaging", Magn. Reson. Med. 2001, vol. 45, p. 521-524).

However, even after application of a de-blurring method of the afore-mentioned type, artefacts often remain in image regions of very strong susceptibility-induced magnetic field gradients. Such artefacts appear in the reconstructed and de-blurred MR image as characteristic ringing artefacts in case of spiral k-space trajectories and can overlap or cover interesting anatomical details. E.g., images obtained by spiral MR imaging of the brain are typically contaminated by off-resonance signal contributions from the sagittal sinus and nasal cavities. The reason for such remaining artefacts is that, in case of strong local magnetic field gradients, the shape of the spiral k-space trajectory deviates to a correspondingly large extent from the theoretical spiral shape for the respective voxels. This is illustrated in the two-dimensional k-space diagrams of FIGS. 2A and 2B. FIG. 2A shows an "ideal" spiral k-space trajectory as it would be obtained in the presence of a perfectly homogeneous main magnetic field $B_0$. A spin echo is generated by applying an RF excitation pulse followed by an RF refocusing pulse, wherein modulated readout magnetic field gradients (typically in the x- and y-directions) are applied subsequent to the RF refocusing pulse. The waveforms of the modulated readout magnetic field gradients define the spiral trajectory along which the spin echo signal is recorded wherein the spiral trajectory is sampled outward from the center of k-space to its periphery. In the examples of FIGS. 2A and 2B the temporal starting point of the trajectory is at the spin echo center, i.e. at the instant at which the nuclear spins are completely in phase after refocusing. In FIG. 2B, $B_0$ is inhomogeneous with a strong gradient in the x-direction such that the corresponding voxel position "sees" a skewed k-space trajectory which significantly deviates from the ideal spiral shape although the imaging sequence and the waveform of the readout magnetic field gradient is same as in FIG. 2A. The effect of the local magnetic field gradient-induced distortion of the k-space spiral in FIG. 2B is a pile-up of samples 200 in a k-space region (marked by the arrow in FIG. 2B) close to the k-space center. It is this pile-up of samples 200 which causes the characteristic ringing artefacts. These artefacts cannot be remedied in practice to a sufficient extent because the $B_0$ map used as a basis for the de-blurring process is never perfectly true to the actual field distribution, in particular in regions of high local magnetic field gradients. As a consequence, the respective k-space region remain over-enhanced, even after de-blurring, and the ringing artefacts are still present.

SUMMARY OF THE INVENTION

From the foregoing it is readily appreciated that there is a need for an improved MR imaging technique. It is an object of the invention to address the above-mentioned limitations and to enable spiral MR imaging with a reduced level of artefacts.

In accordance with the invention, a method of MR imaging of an object positioned in an examination volume of an MR device is disclosed. The method comprises the following steps:
  generating a spin echo by subjecting the object to an imaging sequence comprising an RF excitation pulse followed by an RF refocusing pulse, wherein a modulated readout magnetic field gradient is applied subsequent to the RF refocusing pulse,
  acquiring MR signal data by recording the spin echo along a spiral trajectory in k-space, wherein the waveform of the readout magnetic field gradient defining the spiral trajectory starts before the spin echo center, and
  reconstructing an MR image from the acquired MR signal data.

It is the gist of the invention not to start the spiral acquisition at the echo center, i.e. at the instant at which all nuclear spins are in phase, as it is conventionally done, but to shift the starting point of the gradient waveform defining the spiral k-space trajectory to an instant (well) before the echo center. The result of the approach of the invention is that the k-space position of the first recorded MR signal data (where the center point of the k-space spiral is supposed to be in the ideal case) is shifted in the presence of a local magnetic field gradient from the center of k-space toward the k-space periphery. The magnetic field inhomogeneity still causes a skew of the spiral trajectory and the piling up of signal samples is not prevented by the approach of the invention, but the k-space location of the pile-up is shifted away from the k-space center to k-space regions where there is less relevant image information, so that the ringing artefacts are less pronounced in the reconstructed MR image.

In a preferred embodiment, the start of the waveform of the readout magnetic field gradient is shifted by a quarter to a half, preferably about a third of the total acquisition time of the spiral trajectory with respect to the spin echo center. In this way, the location of the signal pile-up is shifted to a sufficient amount away from the k-space center toward k-space periphery such that the ringing artefacts are much less pronounced or even no longer perceptible at all. In a practical embodiment, the waveform of the readout magnetic field gradient may start 2-15 ms before the spin echo center to achieve the desired effect.

In a possible embodiment, the reconstructed MR image is diffusion-weighted. To this end, a diffusion-sensitizing magnetic field gradient is applied before and after the RF refocusing pulse, wherein the duration of the diffusion-sensitizing magnetic field gradient applied before the RF refocusing pulse is longer than the duration of the diffusion-sensitizing magnetic field gradient applied after the RF refocusing pulse. In this way, it can be achieved that the time shift proposed by the invention does not lead to an increase of the echo time.

In yet another practical embodiment, the reconstruction of the MR image involves de-blurring based on a $B_0$ map. Known de-blurring methods for spiral MR imaging that involve the separate acquisition of a $B_0$ map may be employed to correct the MR signal data for $B_0$ inhomogeneity effects. Such a de-blurring process is advantageous to compensate for the local magnetic field gradient-induced skew of the spiral k-space trajectory, irrespective of the occurrence of signal pile-up.

The method of the invention described thus far can be carried out by means of an MR device including at least one main magnet coil for generating a uniform static magnetic field within an examination volume, a number of gradient coils for generating switched magnetic field gradients in different spatial directions within the examination volume, at least one RF coil for generating RF pulses within the examination volume and/or for receiving MR signals from an object positioned in the examination volume, a control unit for controlling the temporal succession of RF pulses and switched magnetic field gradients, and a reconstruction unit for reconstructing an MR image from the received MR signals. The method of the invention can be implemented, for example, by a corresponding programming of the reconstruction unit and/or the control unit of the MR device.

The method of the invention can be advantageously carried out in most MR devices in clinical use at present. To this end it is merely necessary to utilize a computer program by which the MR device is controlled such that it performs the above-explained method steps of the invention. The computer program may be present either on a data carrier or be present in a data network so as to be downloaded for installation in the control unit of the MR device.

The magnetic resonance imaging system is configured to arrange for reconstruction of the set of magnetic resonance images in that reconstruction software is installed in the computational system or in that the computational system has access to a remote reconstruction facility. The reconstruction software may be installed on a remote server, e.g. in the healthcare institution of even accessible to a data-network in that the reconstruction software may be available in 'the cloud', In these remote configurations the computational system is equipped with functionality to arrange for reconstruction of the set of magnetic resonance images at the remotely located reconstruction function.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention. In the drawings.

DETAILED DESCRIPTION OF THE EMBODIMENTS

Figure 1:
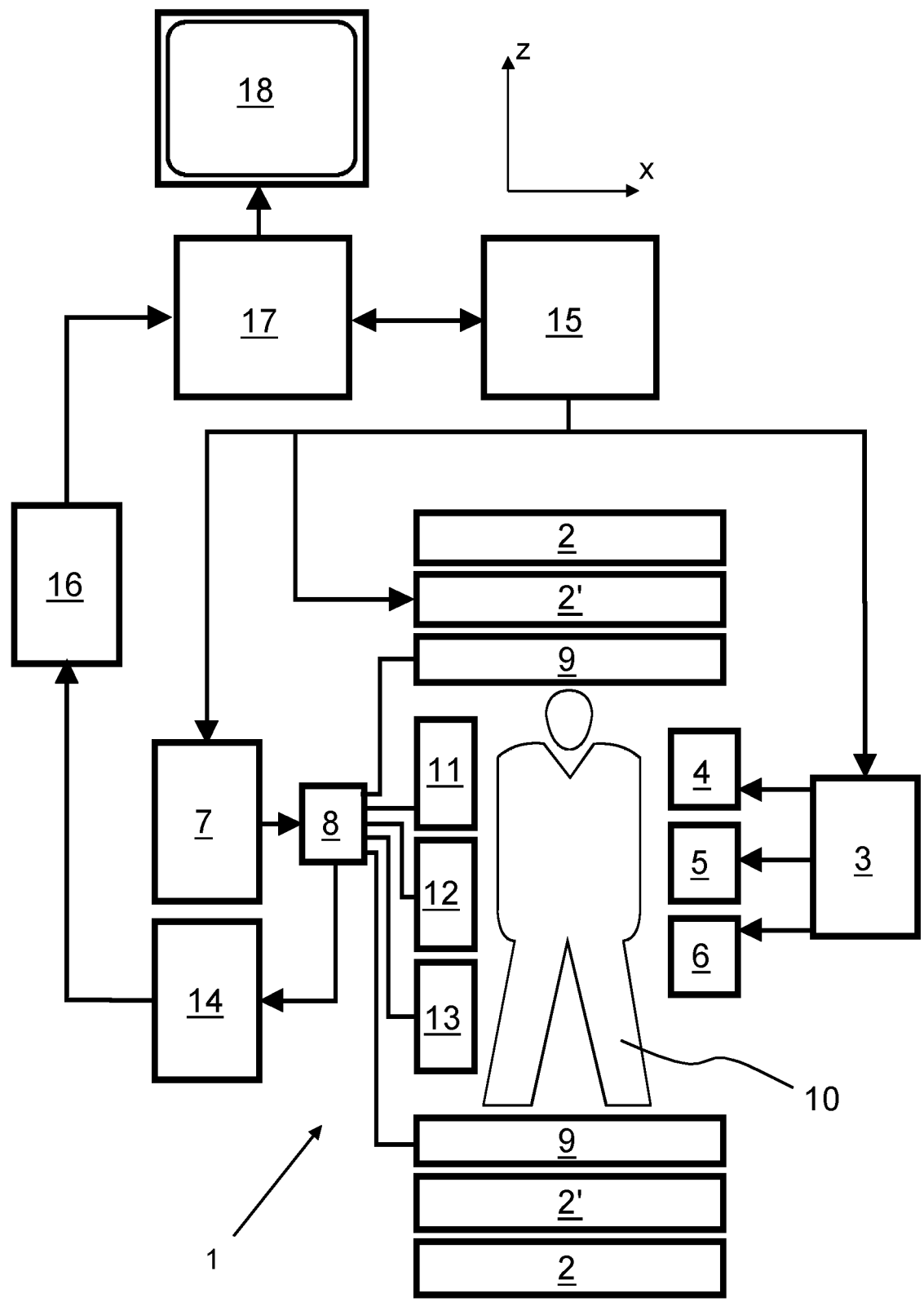
FIG. 1 shows an MR device for carrying out the method of the invention.

With reference to FIG. 1, an MR device 1 is schematically shown. The device comprises superconducting or resistive main magnet coils 2 such that a substantially uniform, temporally constant main magnetic field is created along a z-axis through an examination volume.

A magnetic resonance generation and manipulation system applies a series of RF pulses and switched magnetic field gradients to invert or excite nuclear magnetic spins, induce magnetic resonance, refocus magnetic resonance, manipulate magnetic resonance, spatially and otherwise encode the magnetic resonance, saturate spins, and the like to perform MR imaging.

More specifically, a gradient pulse amplifier 3 applies current pulses to selected ones of whole-body gradient coils 4, 5 and 6 along x, y and z-axes of the examination volume. A digital RF frequency transmitter 7 transmits RF pulses or pulse packets, via a send-/receive switch 8, to a whole-body volume RF coil 9 to transmit RF pulses into the examination volume. A typical MR imaging sequence is composed of a packet of RF pulse segments of short duration which taken together with each other and any applied magnetic field gradients achieve a selected manipulation of nuclear magnetic resonance. The RF pulses are used to saturate, excite resonance, invert magnetization, refocus resonance, or manipulate resonance and select a portion of a body 10 positioned in the examination volume. The MR signals are also picked up by the whole-body volume RF coil 9.

For generation of MR images of limited regions of the body 10, a set of local array RF coils 11, 12, 13 are placed contiguous to the region selected for imaging. The array coils 11, 12, 13 can be used to receive MR signals induced by body-coil RF transmissions.

The resultant MR signals are picked up by the whole body volume RF coil 9 and/or by the array RF coils 11, 12, 13 and demodulated by a receiver 14 preferably including a preamplifier (not shown). The receiver 14 is connected to the RF coils 9, 11, 12 and 13 via send-/receive switch 8.

A host computer 15 controls the gradient pulse amplifier 3 and the transmitter 7 to generate any of a plurality of MR imaging sequences, such as spin echo imaging, to acquire the MR signals along spiral k-space trajectories according to the invention. For the selected sequence, the receiver 14 receives a single or a plurality of MR data along the respective k-space trajectories. A data acquisition system 16 performs analog-to-digital conversion of the received signals and converts each MR signal to a digital format suitable for further processing. In modem MR devices the data acquisition system 16 is a separate computer which is specialized in acquisition of raw image data.

Ultimately, the digital raw image data is reconstructed into an image representation by a reconstruction processor 17 which applies an interpolation or regrinding of the data from the spiral acquisition prior to a Fourier transform or other appropriate reconstruction algorithms. The MR image may represent a planar slice through the patient, an array of parallel planar slices, a three-dimensional volume, or the like. The image is then stored in an image memory where it may be accessed for converting slices, projections, or other portions of the image representation into appropriate format for visualization, for example via a video monitor 18 which provides a man-readable display of the resultant MR image.

The MR device 1 is arranged, e.g. by appropriate programming of the host computer 15 and the reconstruction processor 17, to perform the imaging method of the invention as described herein above and in the following.

Figure 3:
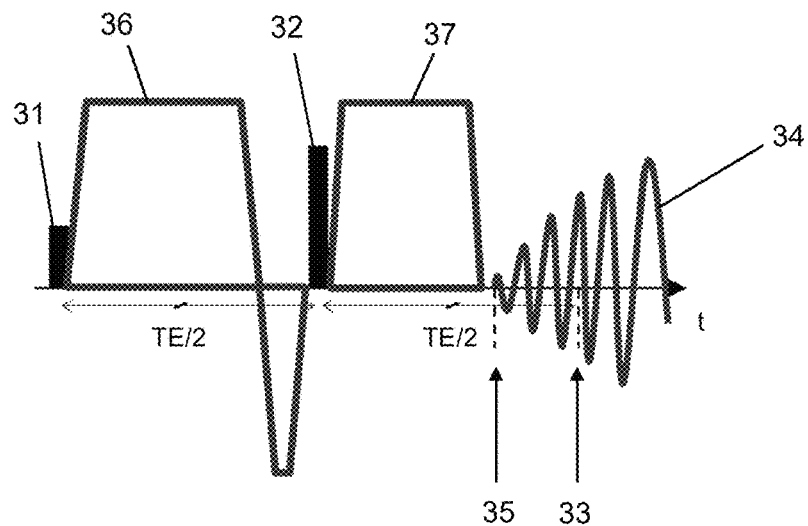
FIG. 3 schematically shows the imaging sequence of the invention.
Figure 4:
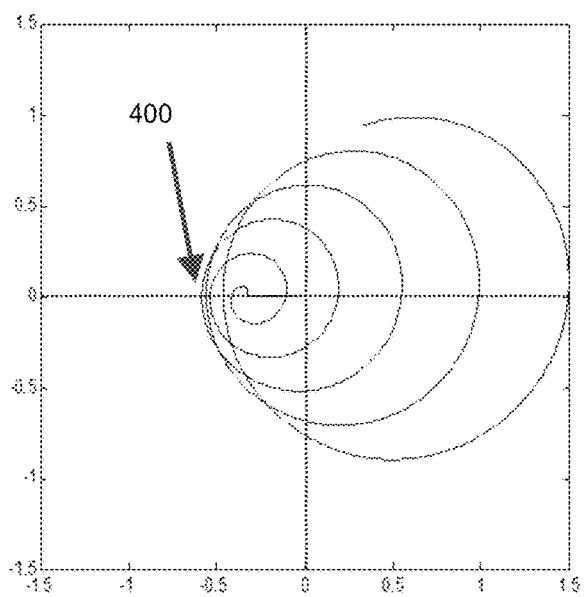
FIG. 4 shows a diagram of k-space illustrating the spiral acquisition scheme of the invention in a second embodiment.
Figure 5:
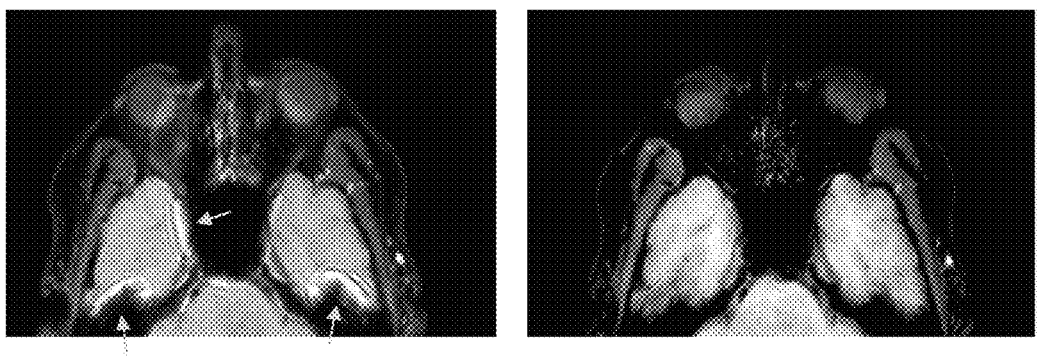
FIG. 5 shows $T_1$-weighted MR brain images with pronounced ringing artefacts (left image) and with a reduced level of artefacts (right image) by employing the method of the invention.

With continuing reference to FIG. 1 and with further reference to FIGS. 3-5, an embodiment of the imaging approach of the invention is explained.

FIG. 3 schematically shows the imaging sequence according to the invention. The imaging sequence is a spin echo sequence starting with an RF excitation pulse 31. After a delay of duration TE/2 (TE being the echo time), an RF refocusing pulse 32 is radiated. This results in the generation of a spin echo (not depicted) of which the spin echo center 33 is located at t=TE (with t=0 at the time of the RF excitation pulse 31). A modulated readout magnetic field gradient 34 is applied subsequent to the RF refocusing pulse 32. For simplicity reasons, FIG. 3 shows only one component of the readout magnetic field gradient waveform generated, e.g., in the x-direction. A further modulated readout magnetic field gradient component (not depicted) is generated in the perpendicular direction (y-direction) to obtain the desired spiral k-space trajectory. According to the invention, the waveform of the readout magnetic field gradient 34 defining the spiral k-space trajectory starts before the spin echo center 33. The starting point 35 of the waveform of the readout magnetic field gradient 34 is shifted by about 2-15 ms relative to the spin echo center 33. A diffusion-sensitizing magnetic field gradient 36, 37 is applied before and after the RF refocusing pulse 32, wherein the duration of the diffusion-sensitizing magnetic field gradient 36 applied before the RF refocusing pulse 32 is longer than the duration of the diffusion-sensitizing magnetic field gradient 37 applied after the RF refocusing pulse 33. This enables the reconstruction of a diffusion-weighted MR image from the MR signal data recorded along the spiral k-space trajectory. The deviation from the standard Stejskal-Tanner scheme (employing symmetric diffusion-sensitizing gradients) has the effect that the shift of the starting 35 to a position before the echo center 33 does not lead to an increase of the echo time TE.

Figure 2A:
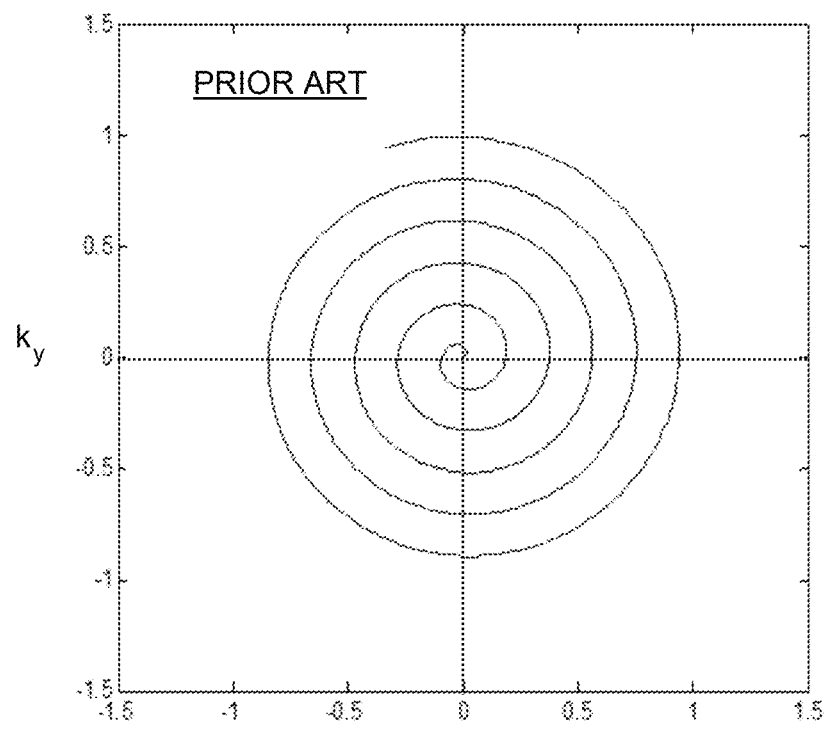
FIGS. 2A, 2B each show a diagram of k-space illustrating spiral sampling without (FIG. 2A) and with main magnetic field inhomogeneity (FIG. 2B)
Figure 2B:
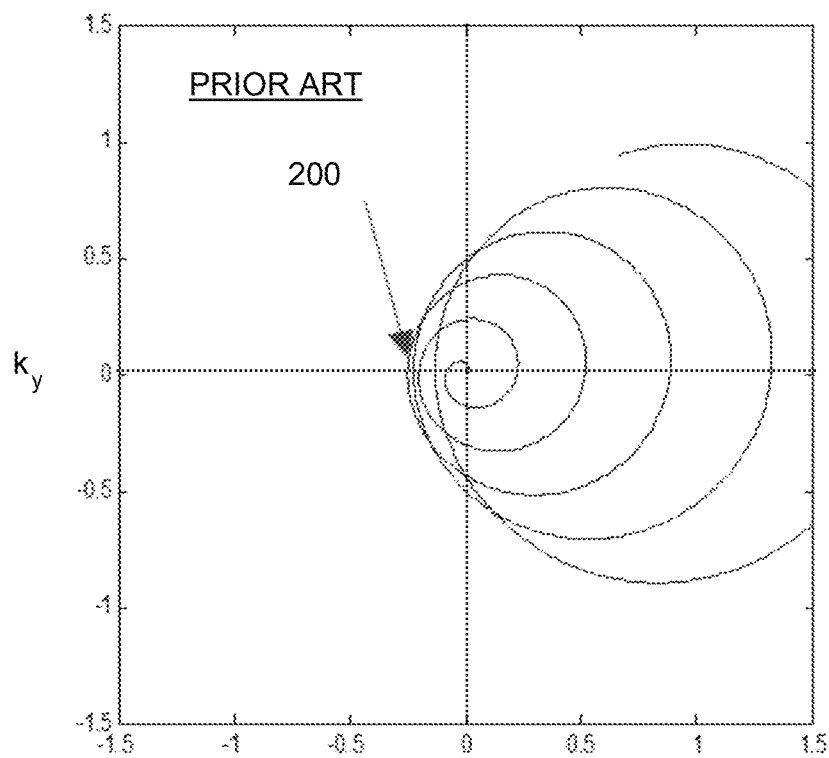

The effect of the approach of the invention is illustrated in FIG. 4. The k-space position of the first recorded MR signal data (where the center point of the k-space spiral is supposed to be in the ideal case) is shifted in the presence of a susceptibility-induced magnetic field gradient from the center of k-space toward the k-space periphery. The magnetic field inhomogeneity still causes the same skew of the spiral trajectory as can be seen from a comparison with FIG. 2B. Also the piling up of signal samples (marked by arrows 200 in FIG. 2B and 400 in FIG. 4 respectively) is not prevented by the approach of the invention, but the k-space location of the pile-up is shifted away from the k-space center to a significant extent to a k-space region where there is less relevant image information. As a consequence, the ringing artefacts are less pronounced.

This can be seen in FIG. 5. The MR signal data of the left MR brain image was acquired in the conventional fashion with the acquisition of the spiral k-space trajectory starting exactly at the spin echo center. The resulting ringing artefacts near the nasal cavities are marked by arrows. The echo time was 31 ms. The approach of the invention was applied for acquisition of the MR data of the right image of FIG. 5. Apart from the time shift of the starting point of the spiral acquisition by 10 ms ahead of the echo center, the same imaging parameters were used as in the left image. As can be seen, the ringing artefacts are much less pronounced than in the left image. Conventional be-blurring based on a separately acquired $B_0$ map was applied during the reconstruction of both images.

The invention claimed is:

1. A method of magnetic resonance (MR) imaging of an object positioned in an examination volume of an MR device, the method comprising:
   generating a spin echo by subjecting the object to an imaging sequence comprising an RF excitation pulse followed by an RF refocusing pulse, wherein a modulated readout magnetic field gradient is applied subsequent to the RF refocusing pulse,
   acquiring MR signal data by recording the spin echo along a spiral trajectory in k-space, wherein a waveform of the modulated readout magnetic field gradient defining the spiral trajectory starts before a spin echo center, wherein a diffusion-sensitizing magnetic field gradient is applied before and after the RF refocusing pulse, so as to diffusion-weight the acquired MR signals and a duration of the diffusion-sensitizing magnetic field gradient applied before the RF refocusing pulse is longer than the duration of the diffusion-sensitizing magnetic field gradient applied after the RF refocusing pulse,
   and
   arranging to reconstruct a diffusion-weighted MR image from the acquired MR signal data.

2. A magnetic resonance (MR) device comprising at least one main magnet coil for generating a uniform; static magnetic field within an examination volume; a number of gradient coils for generating switched magnetic field gradients in different spatial directions within the examination volume; at least one RF coil for generating RF pulses within the examination volume and/or for receiving MR signals from an object positioned in the examination volume; a control unit for controlling a temporal succession of RF pulses and switched magnetic field gradients; a reconstruction unit for reconstructing an MR image from the received MR signals; a processor; and a non-transitory computer readable medium that stored computer program, which when executed by the processor, causes the processor to:
   generate a spin echo by subjecting the object to an imaging sequence comprising an RF excitation pulse followed by an RF refocusing pulse, wherein a modulated readout magnetic field gradient is applied subsequent to the RF refocusing pulse;
   acquire MR signal data by recording the spin echo along a spiral trajectory in k-space, wherein a waveform of the modulated readout magnetic field gradient defining the spiral trajectory starts before a spin echo center wherein a diffusion-sensitizing magnetic field gradient is applied before and after the RF refocusing pulse, so as to diffusion-weight the acquired MR signals and duration of the diffusion-sensitizing magnetic field gradient applied before the RF refocusing pulse is longer than the duration of the diffusion-sensitizing magnetic field gradient applied after the RF refocusing pulse; and
   arrange for reconstructing a diffusion-weighted MR image from the acquired MR signal data.

3. A computer program including executable instructions stored on a non-transitory computer readable medium, which when executed by a processor of a magnetic resonance (MR) device, causes the processor to:
   generate a spin echo by applying an imaging sequence comprising an RF excitation pulse followed by an RF refocusing pulse, wherein a modulated readout magnetic field gradient is applied subsequent to the RF refocusing pulse;
   acquire MR signal data by recording the spin echo along a spiral trajectory in k-space, wherein a waveform of the modulated readout magnetic field gradient defining the spiral trajectory starts before a spin echo center, wherein a diffusion-sensitizing magnetic field gradient is applied before and after the RF refocusing pulse, so as to diffusion-weight the acquired MR signals and a duration of the diffusion-sensitizing magnetic field gradient applied before the RF refocusing pulse is longer than the duration of the diffusion-sensitizing magnetic field gradient applied after the RF refocusing pulse; and
   arrange for reconstructing a diffusion-weighted MR image from the acquired MR signal data.

4. The method of claim 1, wherein the start of the waveform of the modulated readout magnetic field gradient is shifted by one quarter to one half of a total acquisition time of the spiral trajectory with respect to the spin echo center.

5. The method of claim 1, wherein the waveform of the modulated readout magnetic field gradient defining the spiral trajectory starts 2 ms to 5 ms before the spin echo center.

6. The method of claim 1, wherein the reconstruction of the MR image involves de-blurring based on a $B_0$ map.

7. The method of claim 1, wherein the start of the waveform of the modulated readout magnetic field gradient is shifted by approximately one third of a total acquisition time of the spiral trajectory with respect to the spin echo center.

8. The MR device of claim 2, wherein the start of the waveform of modulated the modulated readout magnetic field gradient is shifted by one quarter to one half of a total acquisition time of the spiral trajectory with respect to the spin echo center.

9. The MR device of claim 2, wherein the start of the waveform of the modulated readout magnetic field gradient is shifted by one third of a total acquisition time of the spiral trajectory with respect to the spin echo center.

10. The MR device of claim 2, wherein the waveform of the modulated readout magnetic field gradient defining the spiral trajectory starts 2 ms to 15 ms before the spin echo center.

11. The MR device of claim 2, wherein the reconstructing of the MR image involves de-blurring based on a $B_0$ map.

12. The computer program of claim 3, wherein the start of the waveform of the modulated readout magnetic field gradient is shifted by one quarter to one half of a total acquisition time of the spiral trajectory with respect to the spin echo center.

13. The computer program of claim 3, wherein the start of the waveform of the modulated readout magnetic field gradient is shifted by one third of a total acquisition time of the spiral trajectory with respect to the spin echo center.

14. The computer program of claim 3, wherein the waveform of the modulated readout magnetic field gradient defining the spiral trajectory starts 2 ms to 15 ms before the spin echo center.

15. The computer program of claim 3, wherein the reconstructing of the MR image involves de-blurring based on a $B_0$ map.

\* \* \* \* \*